United States Patent Office 3,551,507
Patented Dec. 29, 1970

---

3,551,507
METHOD OF REDUCING THE TENDENCY OF BUTADIENE TO POLYMERIZE
Taketami Sakuragi, Tokyo, and Tatsuo Sakashita, Kanagawa-ken, Japan, assignors to The Japanese Geon Co., Ltd., Tokyo, Japan, a corporation of Japan
No Drawing. Filed Dec. 18, 1968, Ser. No. 784,941
Claims priority, application Japan, Dec. 30, 1967, 43/84,764
Int. Cl. B01d 3/34; C07c 7/08, 7/18
U.S. Cl. 260—666.5                 5 Claims

ABSTRACT OF THE DISCLOSURE

Substituted aromatic nitro compounds of the general formulae:

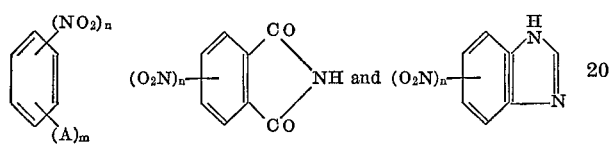

wherein A is selected from the group consisting of —COOR, —CH$_2$COOR, —CH=CHCOOR, —OR, —NR$_2$, —COX, —CH$_2$X, CH$_2$OH, —CH$_2$CN, —CH$_2$NH$_2$, —NHNH$_2$, —CHO, —NCO, —CN, —CONH$_2$, —NHCOCH$_3$, and —COC$_6$H$_5$; $n$ and $m$ are each integer of 1–2; X is a halogen and R is hydrogen or an alkyl group of 1–4 carbon atoms at 0.01–10% concentration in polar solvents such as dimethyl formamide, N-methyl pyrrolidone, acetonitrile etc. inhibit polymerization of butadiene.

---

This invention relates to a method of reducing the tendency of butadiene to polymerize in a polar solvent solution exposed to an elevated temperature.

It is known to use the techniques of solvent absorption and extractive distillation in processes for separating the valuable industrial raw material butadiene in good yield and high purity from a butadiene-containing hydrocarbon mixture such as the so-called C$_4$-hydrocarbon fraction whose chief constituents are, for example, n-butane, isobutane, n-butenes, isobutene, butadiene, etc. It is also known that typical solvents used in these processes include dimethyl formamide, dimethylacetamide, N-methylpyrrolidone, acetonitrile and acetone.

In the operation of these processes, however, the solvent containing butadiene is necessarily exposed to elevated temperatures, e.g. from 80 to 160° C. or even higher, with the consequence that butadiene in the solvent tends to polymerize. As a result, an insoluble polymer is formed and difficulties arise from the clogging of the apparatus with the separating polymer and the formation of a polymeric coating on the inside wall of the apparatus, and so continuous operation over an extended period of time becomes practically difficult.

At a room temperature or lower, the polymerization of butadiene may be prevented to some extent by addition of a conventionally known polymerization inhibitor, e.g. hydroquinone, 4-tert.-butyl-catechol, β-naphthylamine, Methylene Blue, sodium nitrite, etc. However, the polymerization inhibitors as named above are not satisfactory to prevent the polymerization of butadiene when the butadiene-containing solution is subjected to heat treatment at a relatively high temperature, say, 80–160° C. or even higher over a long period of time.

An object of the present invention is to provide a method of preventing the polymerization of butadiene in a solution subjected to an elevated temperature and thereby to enable continuous operation of the solvent absorption or extractive distillation process for a long period of time. Other objects of the invention will be obvious from the contents of the specification hereinafter disclosed.

We have found that incorporation of at least one aromatic nitro compound of the below-mentioned general formula as the polymerization inhibitor or polymerization chain transfer agent (referred to hereinafter merely as polymerization inhibitor) into a butadiene-containing solution reduces tendency of butadiene to polymerize.

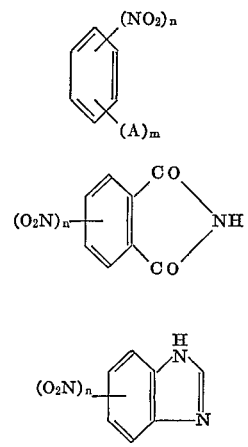

and (in which A is selected from the group consisting of —COOR, —CH$_2$COOR, —CH=CHCOOR, —OR, —NR$_2$, —COX, —CH$_2$X, —CH$_2$OH, —CH$_2$CN, —CH$_2$NH$_2$, —NHNH$_2$, —CHO, —NCO, —CN, —CONH$_2$, —NHCOCH$_3$ and —COC$_6$H$_5$; $n$ and $m$ are each an integer of 1–2; X is a halogen and R is hydrogen or an alkyl group of 1–4 carbon atoms).

In particular, we have found that no or little polymerization of butadiene occurs even when the butadiene-containing solution incorporated with the above compound is subjected to an elevated temperature.

As the polymerization inhibitors for butadiene, nitrobenzene or its nuclear substitution derivative (substituent being alkyl, phenyl, nitro, halogen, etc.) has previously been proposed by the inventors but it has been found that the aromatic nitro compounds used in this invention are more effective than prior inhibitors.

According to this invention, the polymerization of butadiene can be prevented even in the presence of iron rust which rather promotes the polymerization of butadiene. Therefore, it is possible to carry out the extractive distillation and solvent absorption processes over an extended period of time without employing apparatus made from such expensive materials as stainless steel. According to this invention, polymerization of butadiene is also prevented even when water is present in the butadiene-containing solution.

The polymerization inhibitors used in this invention may be applied to any solvent used in the separation of butadiene from hydrocarbon mixture containing butadiene by means of prior extractive distillation or solvent absorption process.

Although the amount of the polymerization inhibitor compound used is capable of wide variation depending upon such factors as the class of solvent, the water content of the solvent, operating conditions and the presence or absence of iron rust, in general, the objectives of this invention can be achieved by the incorporation of about 0.01–10%, and preferably 0.05–5%, based on the weight of the solvent. Excess amount of the polymerization inhibitor causes no particular troubles.

Among the aromatic nitro compounds used in this invention are included mono- and di-nitrobenzoic acid such as p-nitrobenzoic acid, 3,5-dinitrobenzoic acid;
alkyl nitrobenzoate such as ethyl p-nitrobenzoate;
nitrophthalic acid such as 3-nitrophthalic acid;
p-nitrophenylacetic acid and its alkyl ester;
nitrocinnamic acid and its alkyl ester such as p-nitrocinnamic acid, ethyl o-nitrocinnamate;
mono- and di-nitrophenol such as o-nitrophenol, 2,4-dinitrophenol;
nitroresorcinol such as 4-nitroresorcinol;
mono- and di-nitroalkylphenyl ether such as p-nitro phenetole, 2,4-dinitroanisole;
mono- and di-nitroaniline such as p-nitroaniline, 2,4-dinitroaniline;
mono- and di-nitro-N,N-dialkyl aniline such as N,N-dimethyl-p-nitroaniline, N,N-diethyl-2,4-dinitroaniline;
mono- and di-nitrobenzoic acid halide such as p-nitrobenzoyl chloride, 3,5-dinitrobenzoyl chloride;
benzyl nitrohalide such as p-nitrobenzyl bromide;
nitrobenzyl alcohol such as p-nitrobenzyl alcohol;
benzyl nitrocyanide such as p-nitrocyanobenzyl;
nitrobenzylamine such as p-nitrobenzylamine;
mono- and di-nitrophenylhydrazine such as p-nitrophenylhydrazine, 2,4-dinitrophenylhydrazine;
mono- and di-nitrobenzaldehyde such as m-nitrobenzaldehyde, 2,4-dinitrobenzaldehyde; nitrophenyl isocyanate such as p-nitrophenyl isocyanate;
nitrobenzonitrile such as o-nitrobenzonitrile;
nitrobenzamide such as m-nitrobenzamide;
mono- and di-nitroacetanilide such as p-nitroacetanilide, 2,4-dinitroacetanilide;
nitrobenzophenone such as 4-nitrobenzophenone;
nitroanisidine such as 5-nitro-o-anisidine;
mono- and di-nitrosalicylic acid such as 3-nitrosalicylic acid or 3,5-dinitrosalicylic acid;
nitrophthalimide such as 4-nitrophthalimide;
nitrobenzimidazole such as 5-nitrobenzimidazole.

Satisfactory polymerization inhibiting effect may be attained by single use of respective polymerization inhibitor for butadiene. Alternatively, the effect may be ensured by using such polymerization inhibitors in combination therewith or in combination with a polymerization inhibitor such as furfural, benzaldehyde, nitrobenzene, nitronaphthalene or its nuclear substitution derivative, $\alpha,\beta$-unsaturated nitrile, aromatic mercaptan, aliphatic nitro compound, cinnamic aldehyde, aldol, $\alpha$-nitroso-$\beta$-naphthol, isatin, morpholine, aliphatic tertiary mercaptan, alkyl nitrite, $\beta,\beta'$-thiodipropionitrile or N-nitroso-N-methylaniline.

It has been found that the polymeriaztion inhibiting effect of the aromatic nitro compounds used in this invention such as o-nitrophenol, 2,4-dinitrophenol, 2,4-dinitrophenylhydrazine and 4-nitrophthalimide is superior to that of nitrobenzene.

The effect of the polymerization inhibitor used in the invention is further promoted by the presence in the system of substances which are well-known as polymerization inhibitors or stabilizers for unsaturated compounds. Presumably, this is the result of a synergistic action between these substances and the additive used in accordance with the present invention. Known substances of this class include, for example, Methylene Blue, sodium nitrite, hydroquinone, sulphur, phenolic compounds such as 4-tert. butyl catechol, and aromatic amines such as $\beta$-naphthylamine. The conventional amounts or less of such substances may be used.

The polymerization inhibitors according to this invention are also effective in the presence of saturated hydrocarbons such as butane or olefins such as n-butene and isobutene. Accordingly, when the present invention is applied to the separation of butadiene from $C_4$-hydrocarbon fraction by means of the prior solvent absorption or extractive distillation process, polymerization of butadiene is completely prevented and troubles on apparatus due to polymers separated out are entirely removed.

Further, the polymerization inhibitors according to this invention are not reduced at all in their effect even in the presence of higher acetylenes such as methyl acetylene and vinyl acetylene. Accordingly, even in the presence of such higher acetylenes in the $C_4$-hydrocarbon fraction, polymerization of butadiene is completely prevented and consequently butadiene may be separated in good yield.

Now the present invention will be explained in detail in conjunction with the followng examples.

EXAMPLE 1

A glass tube was charged with dimethyl formamide (DMF) and the polymerization inhibitor indicated in the table below. Butadiene was introduced under pressure to a gauge pressure of 5.5 kg./cm.$^2$, while maintaining the temperature at 155° C. After 10 hours, state of the solution was examined and the following results were obtained.

| Additive | Concentration (percent by weight) | State of the solution |
| --- | --- | --- |
| 1. None | | Polymer separated out. |
| 2. p-Nitrobenzoic acid | 0.5 | Transparent. |
| 3. Ethyl p-nitrobenzoate | 0.5 | Practically transparent. |
| 4. p-Nitrocinnamic acid | 0.5 | Do. |
| 5. Ethyl o-nitrocinnamate | 0.5 | Do. |
| 6. o-Nitrophenol | 0.5 | Transparent. |
| 7. 2,4-dinitrophenol | 0.5 | Do. |
| 8. 4-nitroresorcinol | 0.5 | Do. |
| 9. 2,4-dinitroaniline | 0.5 | Do. |
| 10. N,N-diethyl-2,4-dinitroaniline | 0.5 | Practically transparent. |
| 11. 3,5-dinitrobenzoylchloride | 0.5 | Do. |
| 12. p-Nitrobenzyl cyanide | 0.5 | Transparent. |
| 13. p-Nitrobenzylamine | 0.5 | Practically transparent. |
| 14. p-Nitrophenylhydrazine | 0.5 | Transparent. |
| 15. 2,4-dinitrobenzaldehyde | 0.5 | Practically transparent. |
| 16. p-Nitrophenyl isocyanate | 0.5 | Do. |
| 17. o-Nitrobenzonitrile | 0.5 | Do. |
| 18. m-Nitrobenzamide | 0.5 | Slightly turbid. |
| 19. 2,4-dinitroacetanilide | 0.5 | Do. |
| 20. 4-nitrobenzophenone | 0.5 | Transparent. |
| 21. 4-nitrophthalimide | 0.5 | Do. |

EXAMPLE 2

A glass tube was charged with dimethyl formamide (DMF) and the polymerization inhibitor indicated in the table below. Butadiene was introduced under pressure to a gauge pressure of 5.5 kg./cm.$^2$, while maintaining the temperature at 155° C. After 24 hours, state of the solution was examined and the following results were obtained.

| Additive | Concentration (percent by weight) | State of the solution |
|---|---|---|
| 1. None | | Polymer separated out. |
| 2. Sodium nitrate | 0.1 | Turbid. |
| 3. p-Nitrobenzoic acid | 0.5 | Practically transparent. |
| 4. o-Nitrophenol | 0.5 | Transparent. |
| 5. 2,4-dinitrophenol | 0.5 | Do. |
| 6. 2,4-dinitroaniline | 0.5 | Practically transparent. |
| 7. p-Nitrophenylhydrazine | 0.5 | Do. |
| 8. 2,4-dinitrophenylhydrazine | 0.5 | Transparent. |
| 9. p-Nitrobenzylcyanide | 0.5 | Do. |
| 10. 4-nitrobenzophenone | 0.5 | Slightly turbid. |
| 11. 4-nitrophthalimide | 0.5 | Practically transparent. |

EXAMPLE 3

An autoclave having iron rust was charged with DMF and the polymerization inhibitor indicated in the table below. Butadiene was introduced under pressure to a gauge pressure of 6 kg./cm.$^2$, while maintaining the temperature at 155° C. After 48 hours, state of the solution was examined and the following results were obtained.

| Additive | Concentration (percent by weight) | State of the solution |
|---|---|---|
| 1. None | | Large amount of polymer separated out. |
| 2. Sodium nitrite | 0.1 | Turbid. |
| 3. Sulfur | 0.1 | Polymer crystallized out. |
| 4. Methylene Blue | 0.1 | Do. |
| 5. 4-t-butylcatechol | 0.1 | Do. |
| 6. p-Nitrobenzoic acid / Sodium nitrite | 1 / 0.1 | Practically transparent. |
| 7. o-Nitrophenol / 4-t-butylcatechol | 1 / 0.1 | Transparent. |
| 8. 2,4-dinitrophenol / Sulfur | 1 / 0.1 | Do. |
| 9. 2,4-dinitroaniline / Methylene Blue | 1 / 0.1 | Do. |
| 10. p-Nitrophenylhydrazine / Sodium nitrite | 1 / 0.1 | Do. |
| 11. 2,4-dinitrophenyl-hydrazine / 4-t-butylcatechol | 1 / 0.1 | Do. |
| 12. p-Nitrobenzyl cyanide / Sodium nitrite | 1 / 0.1 | Do. |
| 13. p-Nitroanisole / Sodium nitrite | 1 / 0.1 | Do. |
| 14. 4-Nitrobenzophenone / Methylene Blue | 1 / 0.1 | Do. |
| 15. 4-nitrophthalimide / 4-t-butylcatechol | 1 / 0.1 | Do. |
| 16. 5-nitrobenzimidazole / Sodium nitrite | 1 / 0.1 | Do. |

EXAMPLE 4

An autoclave having iron rust was charged with DMF and the polymerization inhibitor indicated in the table below. Butadiene was introduced under pressure to a gauge pressure of 6 kg./cm.$^2$, while maintaining the temperature at 155° C. After 48 hours, state of the solution was examined and the following results were obtained.

EXAMPLE 5

An autoclave having iron rust was charged with DMF, 0.1% by weight of sodium nitrite and 1% by weight of the polymerization inhibitor indicated in the table below. Butadiene was introduced under pressure to a gauge pres-

| Additive | Concentration (percent by weight) | State of the solution |
|---|---|---|
| 1. None | | Large amount of polymer separated out. |
| 2. p-Nitrobenzoic acid | 1 | Practically transparent. |
| 3. o-Nitrophenol | 1 | Do. |
| 4. 2,4-dinitrophenol | 1 | Transparent. |
| 5. 2,4-dinitroaniline | 0.5 | Do. |
| 6. p-Nitrophenylhydrazine | 1 | Slightly. |
| 7. 2,4-dinitrophenyl-hydrazine | 1 | Practically transparent. |
| 8. p-Nitrobenzyl cyanide | 1 | Transparent. |
| 9. 4-nitrobenzophenone | 0.5 | Slightly turbid. |
| 10. 4-nitrophthalimide | 1 | Transparent. | sure of 6 kg./cm.², while maintaining the temperature at 155° C. After 24 hours, state of the solution was examined and the following results were obtained.

| Additive | State of the solution |
|---|---|
| Sodium nitrite (0.1% by weight) | Turbid. |
| 3,5-Dinitrobenzoic acid | Transparent. |
| 3-Nitrophthalic acid | Practically transparent. |
| p-Nitrophenylacetic acid | Do. |
| 2,4-Dinitroanisole | Transparent. |
| p-Nitrophenetole | Do. |
| p-Nitroaniline | Do. |
| N,N-Dimethyl-p-nitroaniline | Do. |
| p-Nitrobenzyl bromide | Do. |
| p-Nitrobenzyl alcohol | Practically transparent. |
| m-Nitrobenzaldehyde | Do. |
| p-Nitroacetanilide | Transparent. |
| 5-Nitro-o-anisidine | Do. |
| 3-Nitrosalicylic acid | Do. |
| 3,5-Dinitrosalicylic acid | Do. |

EXAMPLE 6

Effect obtainable by joint use of two kinds of the polymerization inhibitors was examined by the same way as carried out in the Example 3. The polymerization inhibitors were each added in 0.5% by weight.

| Additive | State of the solution |
|---|---|
| (1) o-Nitrophenol<br>2,4-dinitrophenylhydrazine | Transparent. |
| (2) o-Nitrophenol<br>4-nitrophthalimide | Do. |
| (3) 2,4-dinitroaniline<br>4-nitrophthalimide | Practically transparent. |
| (4) 2,4-dinitrophenylhydrazine<br>4-nitrophthalimide | Transparent. |
| (5) o-Nitrophenol<br>2,4-dinitrophenol | Do. |
| (6) 2,4-dinitroaniline<br>2,4-dinitrophenol | Practically transparent. |

EXAMPLE 7

An autoclave having iron rust was charged with N-methylpyrrolidone and the polymerization inhibitor as indicated below. Butadiene was introduced under pressure to a gauge pressure of 5.5 kg./cm.², while maintaining the temperature at 120° C. After 48 hours, state of the solution was examined and the following results were obtained.

| Additive | Concentration (percent by weight) | State of the solution |
|---|---|---|
| 1. None | | Large amount of polymer separated out. |
| 2. Sodium nitrite | 0.1 | Polymer crystallized out. |
| 3. Sulfur | 0.1 | Do. |
| 4. Methylene Blue | 0.1 | Do. |
| 5. 4-t-butylcatechol | 0.1 | Do. |
| 6. o-Nitrophenol | 1 | Transparent. |
| 7. 2,4-dinitrophenol | 1 | Do. |
| 8. 2,4-dinitroaniline | 1 | Practically transparent. |
| 9. 2,4-dinitrophenylhydrazine | 1 | Transparent. |
| 10. 4-nitrophthalimide | 1 | Practically transparent. |
| 11. p-Nitrobenzyl bromide<br>Sodium nitrite | 1<br>0.1 | Transparent. |
| 12. p-Nitrobenzophenone<br>Methylene Blue | 1<br>0.1 | Do. |
| 13. o-Nitrophenol<br>4-t-butylcatechol | 1<br>0.1 | Do. |
| 14. 2,4-dinitrophenol<br>Sulfur | 1<br>0.1 | Do. |
| 15. 2,4-dinitroaniline<br>Sodium nitrite | 1<br>0.1 | Do. |
| 16. 2,4-dinitrophenylhydrazine<br>4-t-butylcatechol | 1<br>0.1 | Do. |
| 17. 4-nitrophthalmiide<br>Methylene Blue | 1<br>0.1 | Do. |

EXAMPLE 8

An autoclave having iron rust was charged with acetonitrile and the polymerization inhibitor as indicated below. Butadiene was introduced under pressure to a gauge pressure of 13 kg./cm.², while maintaining the temperature at 120° C. After 24 hours, state of the resulting solution was examined and the following results were obtained.

| Additive | Concentration (percent by weight) | State of the solution |
|---|---|---|
| 1. Nitrobenzene | 0.1 | Slightly turbid. |
| 2. o-Nitrophenol | 0.1 | Practically transparent. |
| 3. 2,4-dinitrophenol | 0.1 | Transparent. |
| 4. 2,4-dinitroaniline | 0.1 | Slightly turbid. |
| 5. p-Nitrobenzyl cyanide | 0.1 | Practically transparent. |
| 6. 2,4-dinitrophenylhydrazine | 0.1 | Transparent. |
| 7. 4-nitrophthalimide | 0.1 | Do. |

What we claim is:

1. A method of reducing the tendency of butadiene to polymerize in a polar solvent solution exposed to an elevated temperature, which comprises adding to the solution, at least one aromatic nitro compound of the formulae

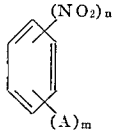

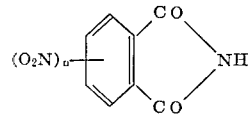

or

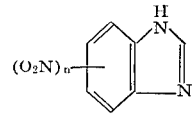

A is selected from the group consisting of —COOR, —CH$_2$COOR, —CH=CHCOOR, —OR, —NR$_2$, —COX, —CH$_2$X, —CH$_2$OH, —CH$_2$CN, —CH$_2$NH$_2$, —NHNH$_2$, —CHO, —NCO, —CN, —CONH$_2$, —NHCOCH$_3$ and —COC$_6$H$_5$; $n$ and $m$ are each an integer of 1–2; X is a halogen and R is hydrogen or an alkyl group of 1–4 carbon atoms.

2. A method according to claim 1, wherein said butadiene comprises a C$_4$-hydrocarbon fraction.

3. A method according to claim 1, wherein said solution comprises a polar solvent selected from the group consisting of dimethyl formamide, dimethylacetamide, N-methylpyrrolidone, acetonitrile and acetone.

4. A method according to claim 1, wherein said polymerization inhibitor is added to the solution in amount of 0.01 to 10% by weight based on the solvent of the solution.

5. A method according to claim 4, wherein the amount is 0.05 to 5%.

References Cited

UNITED STATES PATENTS

| 2,388,041 | 10/1945 | Craig | 203—9 |
|---|---|---|---|
| 2,304,728 | 12/1942 | Boyer et al. | 203—9X |
| 2,526,567 | 10/1950 | Drake et al. | 203—9X |
| 2,787,634 | 4/1957 | Coover et al. | 260—465.9 |
| 2,809,155 | 10/1957 | Buehler | 203—9 |
| 2,888,386 | 5/1959 | Brower | 203—92X |
| 3,309,412 | 3/1967 | Sakuragi et al. | 260—666.5 |
| 3,340,160 | 9/1969 | Waldby | 252—405X |
| 3,405,189 | 10/1968 | Sakuragi et al. | 260—666.5 |
| 3,407,240 | 10/1968 | Sakashita et al. | 260—666.5 |

FOREIGN PATENTS

| 20,281 | 8/1968 | Japan | 260—666.5 |

DELBERT E. GANTZ, Primary Examiner

G. E. SCHMITKONS, Assistant Examiner

U.S. Cl. X.R.

203—7, 9, 51, 57, 58, 60, 62; 208—48; 252—405; 260—681.5